United States Patent [19]

Umeda

[11] Patent Number: 5,037,498
[45] Date of Patent: Aug. 6, 1991

[54] CONTINUOUS HONEYCOMB PANEL MOLDING METHOD

[75] Inventor: Katsuhiko Umeda, Kodaira, Japan
[73] Assignee: Jamco Corporation, Tokyo, Japan
[21] Appl. No.: 439,984
[22] Filed: Nov. 21, 1989

[30] Foreign Application Priority Data

Dec. 28, 1988 [JP] Japan .................. 63-329372

[51] Int. Cl.⁵ .............. C09J 5/02; B30B 12/00; B30B 15/34
[52] U.S. Cl. .................. 156/307.3; 156/499; 156/583.1
[58] Field of Search ................ 156/324, 499, 307.3, 156/583.1

[56] References Cited

U.S. PATENT DOCUMENTS

| 3,86,684 | 1/1975 | Vance, Sr. | 156/140 |
| 2,977,630 | 4/1961 | Bazler . | |
| 3,236,714 | 2/1966 | Traut . | |
| 4,049,487 | 9/1977 | Kunz | 156/324 |
| 4,495,021 | 1/1985 | Goldsworthy | 156/499 |
| 4,594,129 | 6/1986 | Bok | 156/499 |

OTHER PUBLICATIONS

"Design and Fabrication Techniques for Honeycomb of NOMEX Aramid Sandwich Structures", E. I. Du Pont de Nemours & Co. (Inc.), Textile Fibers Department Industrial Fibers Marketing Centre Road Building, Wilmington, Del. 1989.

Primary Examiner—Michael W. Ball
Assistant Examiner—Adrienne C. Johnston
Attorney, Agent, or Firm—Armstrong, Nikaido, Marmelstein, Kuboucik, & Murray

[57] ABSTRACT

A method for continuously molding a honeycomb panel having a sandwich structure wherein a plastic composite is bonded to both surfaces of a honeycomb-shaped core member. A long honeycomb sandwich panel is formed by repeating the following steps:
(1) laminating a prepreg to the upper and lower surfaces of a band-like honeycomb core member to form a band-like blank;
(2) feeding the band-like blank between a pair of upper and lower hot plates having a rectangular plane shape;
(3) pressurizing the hot plates to apply pressure and heat to part of the band-like blank for a preset time; and
(4) relieving the pressure exerted in the hot plates and feeding the band-like blank by a distance corresponding to a partial length of the hot plates.

3 Claims, 4 Drawing Sheets

CONTINUOUS HONEYCOMB PANEL MOLDING METHOD

BACKGROUND OF THE INVENTION

1. Field of the Invention

The present invention relates to a continuous molding method for a honeycomb sandwich panel having a structure wherein a plastic composite is bonded to each of both faces of a honeycomb-shaped core member.

2. Background and Problem

Honeycomb sandwich panels with a honeycomb member sandwiched inside are widely used as a construction material, etc. particularly, honeycomb sandwich panels (hereinafter referred to as "honeycomb panel(s)") using a plastic composite are characterized by having a light weight and a high strength, and are in wide use, not only as interior materials of aircraft, such as floor material, wall material, galley and lavatory module but also as sheathing materials such as control plane, door, duct and fairing.

FIG. 6 shows a conventional structure of a honeycomb panel 1. Surface materials 20a and 20b are bonded to both surfaces of a honeycomb core member 10 and, where required, a decorative material 30 is stuck on the surface(s) of both or one of the surface materials 20a and 20b to obtain a final product.

The honeycomb core member 10 is formed using, for example, paper, plastic or aluminum, but for aircraft there is used a material obtained by forming short fibers of an aromatic polyamide in the shape of paper and impregnating the paper-like fibers with a phenolic resin.

As the surface materials 20a and 20b there are used plates and aluminum, but for aircraft there are used sheet-like prepregs obtained by impregnating fabrics or short fibers such as glass, aramid or carbon fabrics or fibers with phenols or epoxy resins followed by forming in the shape of sheet. Surface materials 20a and 20b of prepreg contain a thermosetting resin and have plasticity at room temperature. Therefore, if the surface materials 20a and 20b are laminated to both surfaces of the honeycomb core member 10 followed by the application of pressure and heat, the surface materials 20a and 20b will be bonded to the honeycomb core member by thermosetting of the resin which has been impregnated into the surface materials to form a honeycomb panel 1.

Where required, a decorative material 30 is stuck on the upper surfaces of the surface materials through an adhesive film or the like to obtain a final product.

As methods adopted heretofore for forming the honeycomb panel 1 there are mentioned a vacuum bag molding method, an autoclave molding method and a heat press molding method.

The vacuum bag molding method is the simplest honeycomb panel molding method. According to this method, as shown in FIG. 7, a releasing agent such as wax or silicone is applied onto the upper surface of a mold 40, onto which are then laminated the surface material 20b, honeycomb core member 10 and surface material 20a successively in this order. In many cases, the surface materials 20a and 20b are each one sheet, but in some specification of a honeycomb panel, they each comprise a plurality of surface materials and an adhesive sheet may be sandwiched in between the surface materials.

After the lamination of the honeycomb panel materials has been completed, the upper surface is covered with a release paper 42, which in turn is covered with a bleeder cloth 43. As the bleeder cloth 43, which is used for discharging the inside air to the exterior, there is used a non-woven fabric formed from polyester. The outside of the bleeder cloth 43 is covered with a flexible film 45 having no gas permeability such as Mylar, and the gap between it and the mold 40 is sealed using a sealing tape 47 to form a bag 48.

Then, the inside, indicated at 46, of the flexible film 45 is communicated with a vacuum source (not shown) to discharge the air from the inside 46, resulting in that the whole of the flexible film 45 is compressed by atmospheric pressure and the honeycomb panel undergoes a pressure of 1 kg/cm$^2$. At this time, the bleeder cloth 43 functions to ensure the discharge of air from the inside 46, attain uniform pressurization and absorb excess resin discharged upon thermosetting of the surface materials 20a and 20b of prepreg to prevent the formation of air pocket between prepreg layers.

The bag 48 thus formed is put an air circulation type oven and the prepreg is hardened at specified temperature and time to form a honeycomb panel.

The autoclave molding method is used in combination with the vacuum bag molding method described above. The bag 48 in a vacuum condition is put into an autoclave (a heating and pressurizing pot), in which heating and pressurization are performed for a predetermined time and thermoset bonding is attained at a pressure not lower than atmospheric pressure. Therefore, the products obtained by the autoclave molding method are high in strength and applicable also to large-sized parts.

The heat press molding method forms a honeycomb panel by heat pressing using upper and lower molds. The productivity is high although it requires molds matching product shapes.

In the above conventional methods, since the lamination of the honeycomb member and the surface materials is performed by manual operation, the productivity is low and it is impossible to effect continuous molding.

The present invention provides a continuous molding method for a long honeycomb panel.

SUMMARY OF THE INVENTION

According to the present invention, a long honeycomb panel is formed continuously by repeating the following steps (1) to (4):

(1) sandwiching a band-like honeycomb core member in between upper and lower surface materials of prepreg to form a band-like honeycomb panel blank;

(2) feeding the band-like blank between a pair of upper and lower hot plates of a rectangular plane shape having a width corresponding to the width of the blank and having a length extending in the longitudinal direction of the blank;

(3) pressurizing the hot plates to apply pressure and heat to part of the band-like blank for a preset time; and (4) relieving the pressure exerted on the hot plates and feeding the band-like blank by a distance corresponding to a partial length of the hot plates.

By the above steps there can be obtained a long honeycomb panel, but it is sometimes desired to perform additional heating to ensure hardening, depending on the kind of the thermosetting resin to be impregnated into the prepreg. In the present invention, such additional heating is attained by passing the long honeycomb panel between a lower hot plate having air holes for the ejection of high-temperature air upwards and an upper hot plate having air holes for the ejection of high-temperature air downwards and adapted to float by a current of air.

Thus, according to the present invention, a band-like blank having a laminated structure with a honeycomb member sandwiched in between upper and lower surface materials of prepreg is subjected to pressurizing and heating under step feed, whereby a long honeycomb panel can be obtained continuously using a small-sized molding apparatus.

If necessary, moreover, thermosetting is accelerated by subjecting the thus-formed long honeycomb panel to additional heating. This additional heating apparatus utilizes a high-temperature air bearing, so during passing through the apparatus, the honeycomb panel is improved in its evenness and flatness accuracy, thus affording a high quality honeycomb panel.

DETAILED DESCRIPTION OF THE PREFERRED EMBODIMENTS

An embodiment of the present invention will be described hereinunder with reference to the drawings.

Figure 1:
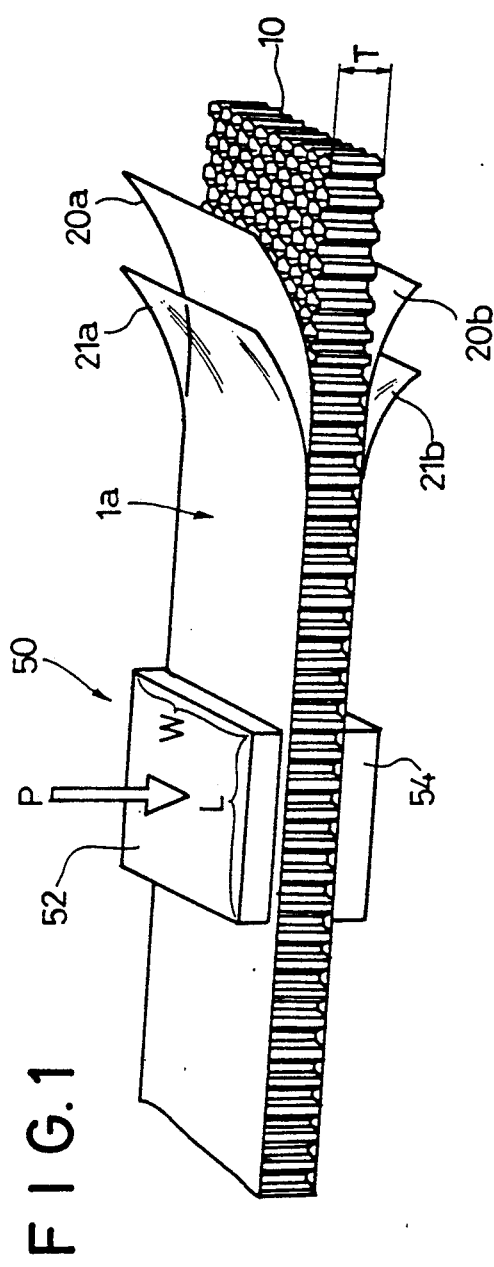
FIG. 1 is a perspective view showing a pressurizing and heating step in the molding method of the present invention.

FIG. 1 to 4 illustrate operation steps in the molding method according to the present invention, of which FIG. 1 shows a first step.

A honeycomb panel blank $1a$ comprising a band-like honeycomb core member 10 and band-like surface materials $20a$, $20b$ of a prepreg laminated to both upper and lower surfaces of the honeycomb core member 10 in a sandwiched fashion is fed continuously from the right to the left in FIG. 1 together with overlying and underlying release films $21a$, $21b$ of polyester or polypropylene.

Halfway of the feed path of the band-like blank $1a$ there is disposed a continuous molding apparatus indicated wholly by the reference numeral 50. The continuous molding apparatus 50 is provided with an upper hot plate 52 and a lower hot plate 54. The lower hot plate 54 is fixed, while the upper hot plate 52 is constructed so that it can apply pressure P toward the lower hot plate 54 using a suitable means. The upper and lower hot plates 52, 54 are constructed to have the same shape and size. Since honeycomb panels are usually about 120 cm (4 feet) in width, the hot plates are set at about 120 cm in both width W and length L.

The blank $1a$ which has reached the molding apparatus 50 is sandwiched in between the upper and lower hot plates 52, 54 and subjected to pressurizing and heating for a certain time under the application of pressure P to the upper hot plate 52. The degree of pressurizing and that of heating are suitably selected according to the material of the blank $1a$. For example, when the honeycomb core member 10 has a thickness T of 18.2 mm and the surface materials $20a$ and $20b$ are each a prepreg 0.25 mm thick obtained by impregnating glass fibers with a phenolic resin, the pressure P, heating temperature and processing time are set at about 3 kg/cm$^2$, about 130° C. and about 3 minutes, respectively.

Figure 2:
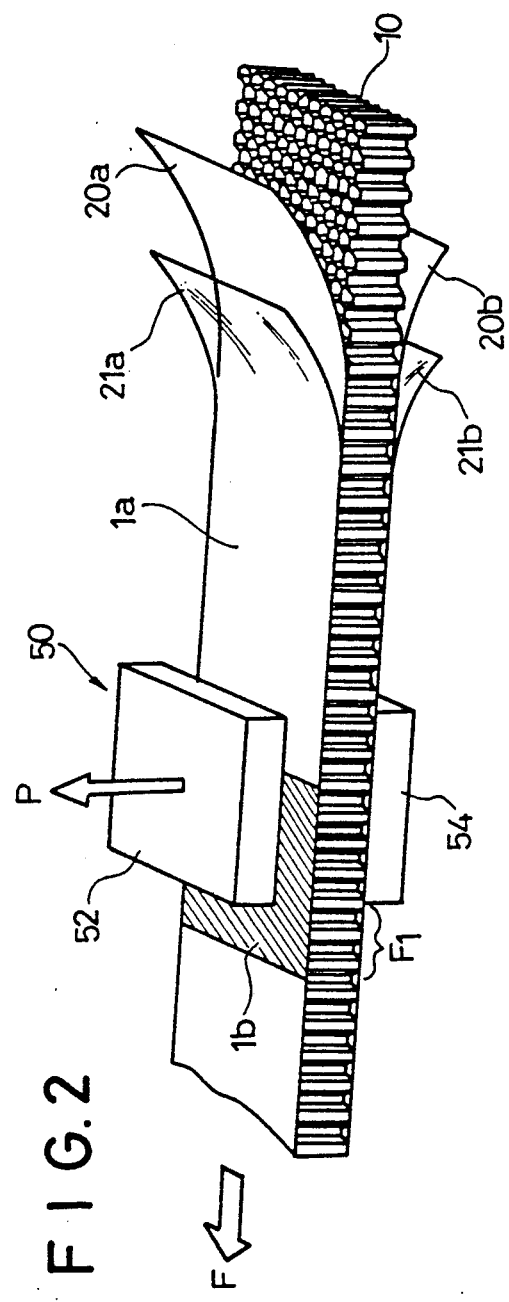
FIG. 2 is a perspective view showing a step of relieving pressure and feeding a blank.
Figure 3:
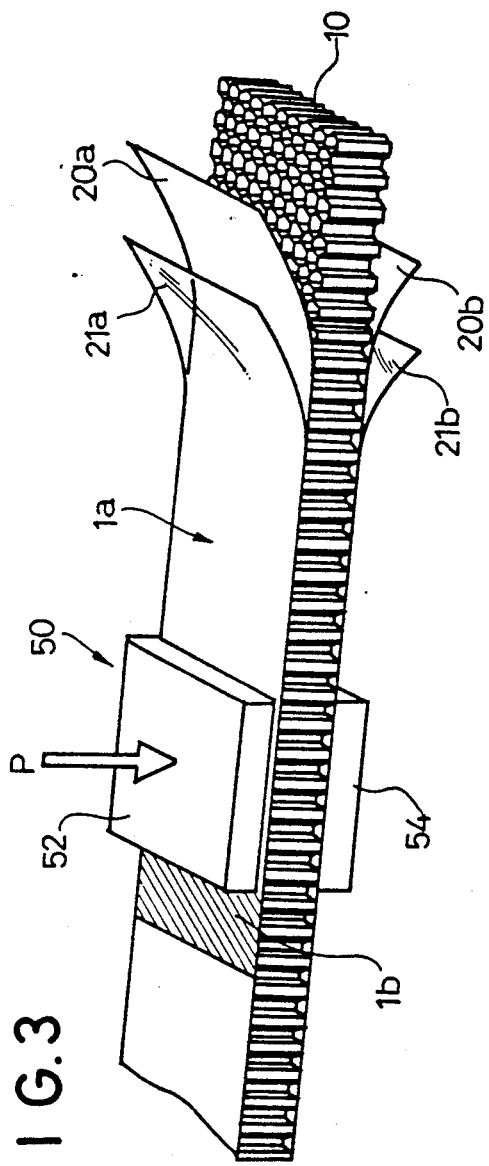
FIG. 3 is a perspective view showing a repressurizing and heating step after completion of the feed.

After the pressurizing is over in about 3 minutes, the pressure P of the upper hot plate 52 is reduced to zero and the blank $1a$ is fed in the direction of arrow F by a suitable means, as shown in FIG. 2. The length $F_1$ for each feed is set, for example, at about 15 cm. The feed length $F_1$ corresponds to 12.5% of the length, L=120 cm, of each hot plate. An oblique line portion $1b$ in FIG. 2 corresponds to the area of each of the upper and lower hot plates 52, 54 and it is a semi-finished product after subjected to the first heating and pressurizing.

After completion of the feed $F_1$ of about 15 cm, the blank $1a$ is stopped and, as shown in FIG. 3, the pressure P is again applied to the upper hot plate 52.

The pressurizing and heating of this time are the same as in FIG. 1. The blank $1a$ is subjected to pressurizing at about 3 kg/cm$^2$ and heating about 130° C. for 3 minutes or so.

Figure 4:
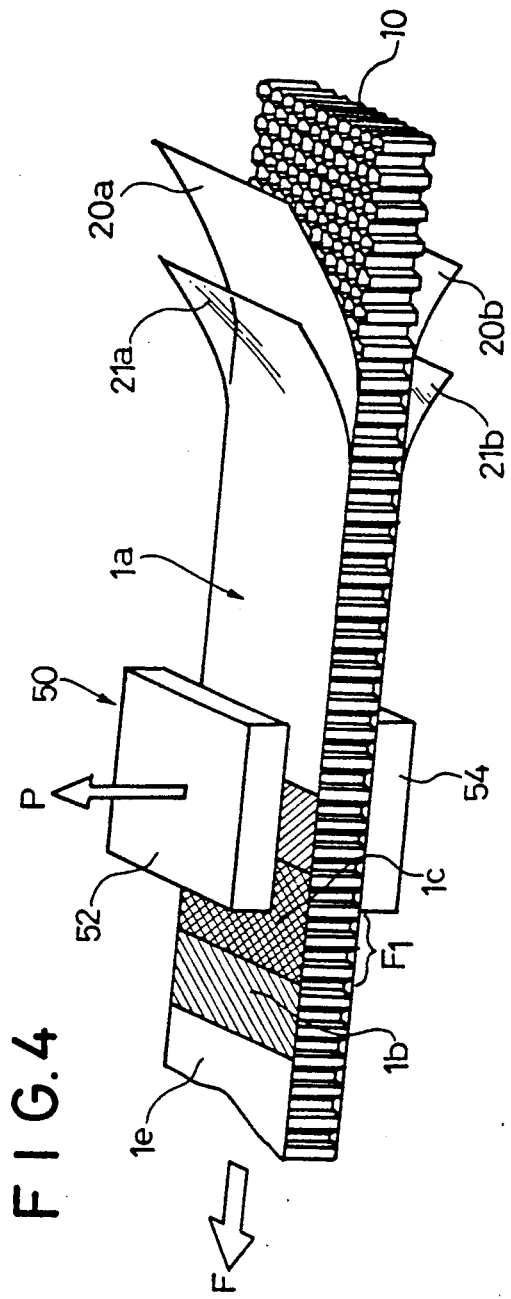
FIG. 4 is a perspective view showing a step of relieving pressure and again feeding the blank.

When the pressurizing is over in about 3 minutes, the pressure P of the upper hot plate 52 is reduced to zero and the blank $1a$ is fed in the direction of arrow F, as shown in FIG. 4. This feed length $F_1$ is also set at about 15 cm. By this step there is completed the molding of a semi-finished product $1c$ which has been subjected to the second application of pressure and heat.

By repeating the above steps there is completed a honeycomb panel product $1e$. If the length L of the upper and lower hot plates 52, 54 is 120 cm, a single pressurizing time is 3 minutes and the feed length $F_1$ is 15 cm, an average feed rate is 5 cm/min. While the blank $1a$ passes through the molding apparatus 50, it is pressurizied eight times, so the total pressurizing and heating time is 24 minutes.

The number of times of pressurizing and the total pressurizing and heating time can be adjusted according to the kind of the thermosetting resin to be impregnated into the surface materials $20a$ and $20b$, and it is easy to determine the pressurizing and heating time required for completing the product $1e$.

By the above process there can be obtained a long honeycomb panel continuously, which is cut into a predetermined length to obtain the final product.

Certain material of the honeycomb panel and kind of the thermosetting resin require a longer time until completion of thermosetting. This problem can be remedied by prolonging the passing time through the molding apparatus 50 or by enlarging the length L of the hot plates 52, 54. However, the former results in that the average feed rate becomes lower, leading to deterioration of productivity, and the latter results in that the equipment becomes too large, leading to deterioration of cost performance.

In the present invention, to avoid such inconveniences, there is provided an additional heating step which follows the continuous molding steps, and where required, the honeycomb panel which has gone through the molding steps is subjected to additional heating and the flatness of the panel is corrected, thereby attaining a continuous molding of honeycomb panel with a higher accuracy.

Figure 5:
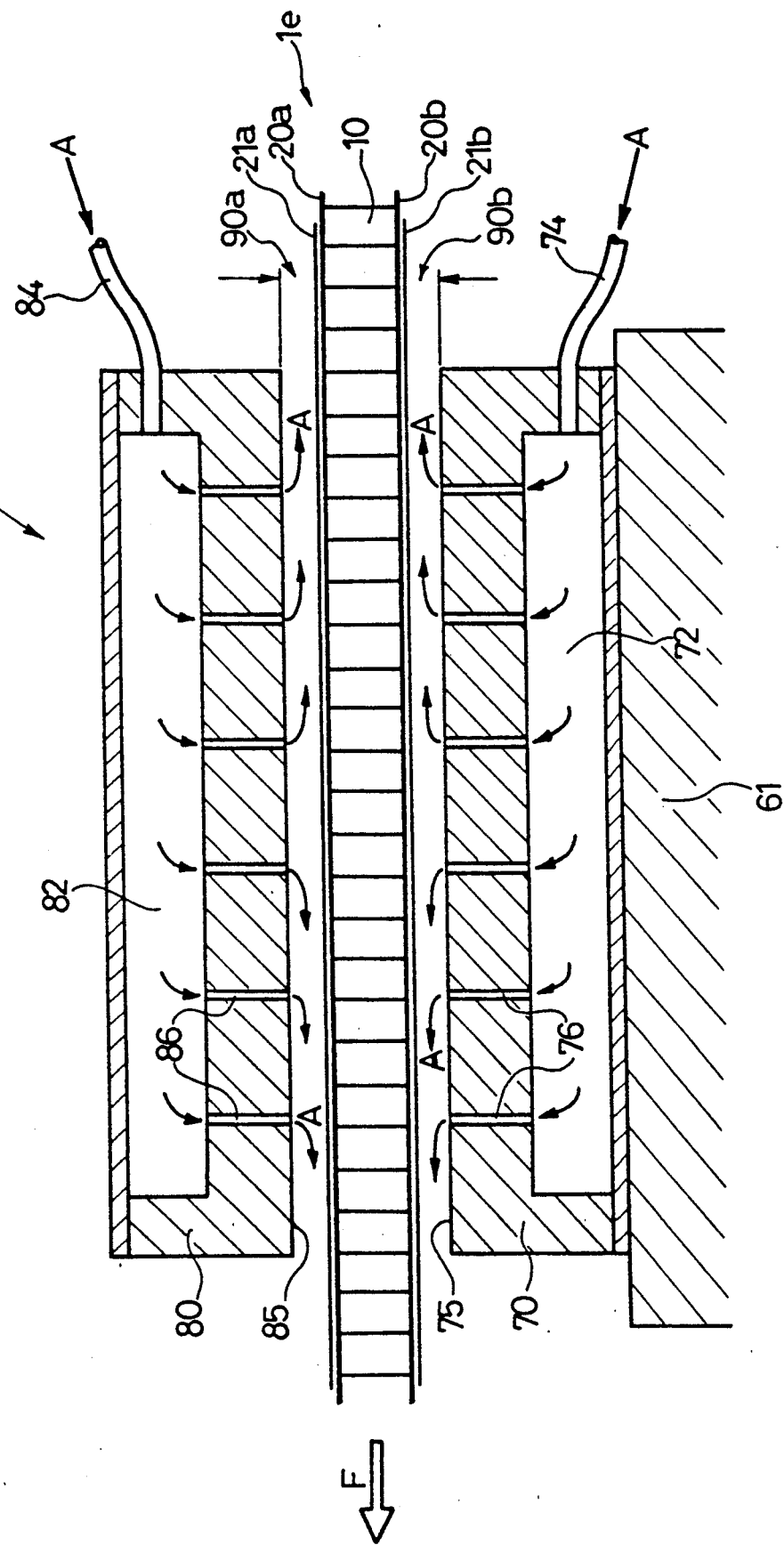
FIG. 5 is a sectional view showing an additional heating step and an apparatus used for the same step.
Figure 6:
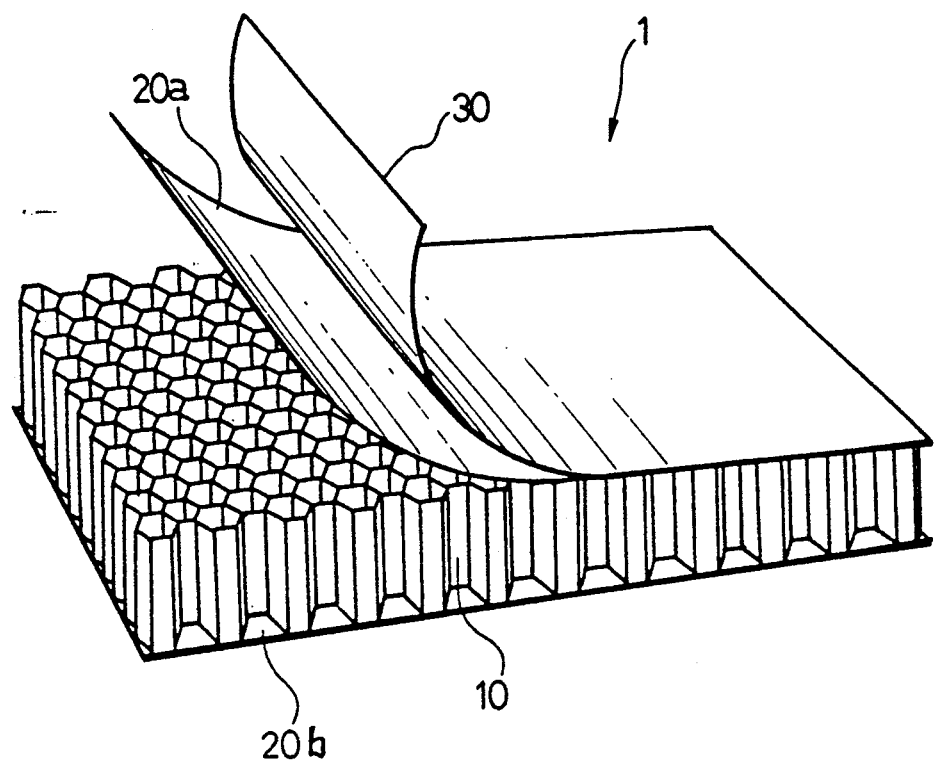
FIG. 6 is a perspective view showing the structure of a honeycomb panel.
Figure 7:
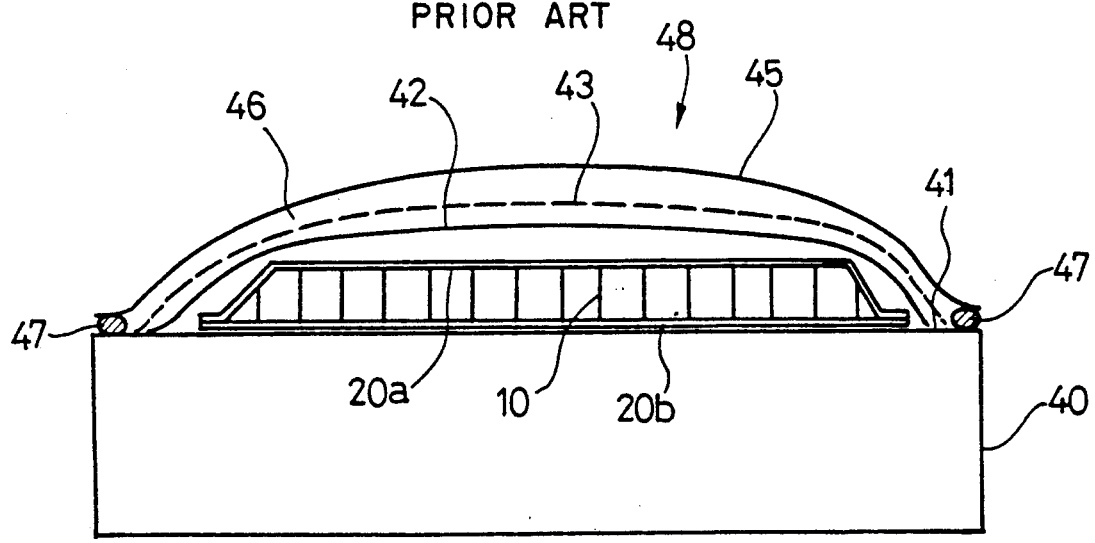
FIG. 7 is a view explanatory of a conventional molding method.

FIG. 5 shows an outline of the additional heating step. An additional heating apparatus indicated wholly by the reference numeral 60 has a lower additional heating plate 70 mounted on a base 61 and an upper additional heating plate 80 adapted to float by virtue of an air current. Like the molding apparatus, the upper and lower additional heating plates 70, 80 have a square plane shape 120 cm in length and 120 cm in width.

Inside the lower additional heating plate 70 there is formed an air chamber 72, which is connected to a high-temperature high-pressure air feeding device through a pipe 74. Between the air chamber 72 and an upper surface 75 of the heating plate 70 there are formed a large number of air holes 76 so that the high-temperature high-pressure air fed to the air chamber 72 through the pipe 74 is ejected from the air holes 76.

Also in the interior of the upper additional heating plate 80 there is formed an air chamber 82, which is connected to a high-temperature high-pressure air feeding device through a pipe 84. Between the air chamber 82 and a lower surface 85 of the heating plate 80 there are formed a large number of air holes 86 so that the high-temperature high-pressure air fed to the air chamber 82 through the pipe 84 is ejected from the air holes 86.

The honeycomb panel 1e which has gone through the molding steps is sandwiched between the upper and lower additional heating plates 80, 70 and air A is fed through the pipes 74 and 84 at a temperature of 130° C. and a pressure of 2 to 3 kg/cm$^2$. As a result, the air A jetting from the air holes 76 and 86 of both heating plates 70 and 80 forms an air bearing of air film between the heating plates and the honeycomb panel 1e. It has experimentally been confirmed that when the weight of the upper additional heating plate 80 is 800 kg, air bearing 90a and 90b formed above and below the upper and lower surfaces of the honeycomb panel 1e are each several microns in size.

If in this state the honeycomb panel 1e is fed in the direction of arrow F, it will be subjected to additional heating at 130° C., whereby additional thermosetting of the impregnated resin is completed. In this case, warp or distortion, if any, of the honeycomb panel 1e can be corrected while the panel passes between the upper and lower additional hot plates 70, 80. The surfaces of the surface materials 20a and 20b are smoothed and improved their flatness as the panel passes between the upper and lower surfaces 75, 85 of the lower and upper additional hot plates 70, 80 through gaps each of several microns.

If this additional heating step is carried out subsequently to the molding process, the honeycomb panel 1e undergoes additional heating for 24 minutes while passing through the additional heating apparatus of 120 cm long because the average feed rate of the panel 1e is 5 cm/min. The additional heating apparatus may be arranged in series in a number which permits satisfactory thermosetting synergistically with the heating in the molding process.

According to the present invention, as set forth above, in molding a honeycomb panel having surface materials of prepreg, a blank having a laminated structure wherein a honeycomb core member is sandwiched in between upper and lower surface is heated and pressurized by being held between hot plates which are vertically opposed to each other, then after the lapse of a certain time the pressure is relieved and the blank is fed 10–15% of the hot plate length and stopped, followed by heating and pressurizing again. By repeating the above steps there can be obtained a long honeycomb panel continuously.

Further, by the additional heating step utilizing air bearing, not only thermosetting of the thermosetting resin can be effected more completely but also the evenness and flatness of the honeycomb panel can be improved.

What is claimed is:

1. A method for continuously molding a honeycomb panel having a sandwich structure wherein surface materials of a prepreg of a plastic composite impregnated with a thermosetting resin are bonded to both surfaces of a honeycomb core member, said method comprising the steps of:
   a) sandwiching a band-like honeycomb core member in between upper and lower surface materials of a prepreg to form a band-like honeycomb panel blank;
   b) feeding said band-like panel blank between a pair of upper and lower hot plates of a rectangular plane shape having a width corresponding to the width of the blank and having a length extending in the longitudinal direction of the blank;
   c) stopping said band-like panel blank with a part of said blank-like panel between said hot plates;
   d) pressurizing said hot plates against said stopped band-like blank and applying pressure and heat to said part of said band-like panel blank between said hot plates for a preset time;
   e) after said preset time, relieving said pressure exerted by said hot plates and feeding said band-like panel blank a distance corresponding to a partial length of said hot plates and stopping said band-like panel blank;
   f) repeating said steps b., c., d. and e. and forming a long, continuous honeycomb panel from said panel blank, and
   g) subjecting said long, continuous honeycomb panel obtained by repeating said steps b., c., d., and e to an additional heating by passing said continuous honeycomb panel between a lower hot plate having air holes for the ejection of a high-temperature air upward and an upper hot plate having air holes for the ejection of a high-temperature air downwards, said downwards air forming an air current floating said panel below said upper hot plate.

2. A method according to claim 1, wherein the width of each of said upper and lower hot plates is equal to the width of the honeycomb panel and the length thereof is equal to said width.

3. A method according to claim 1, wherein the weight of said upper hot plate and the pressure of the high-temperature air jetting from the upper and lower hot plates are selected to form an air layer of several microns above and below the upper and lower surfaces of the honeycomb panel.

* * * * *